United States Patent

Hibino et al.

Patent Number: 5,258,681
Date of Patent: Nov. 2, 1993

[54] MAGNETIC SLOT WEDGES FOR DYNAMO-ELECTRIC MACHINES

[75] Inventors: Sadayoshi Hibino, Suzuka; Tadayuki Sato, Mie; Motoyasu Mochizuki, Aichi; Tadatomo Kimura; Shigeo Ozawa, both of Yokkaichi; Takao Sawa; Yasuo Sakata, both of Yokohama, all of Japan

[73] Assignee: Kabushiki Kaisha Toshiba, Kanagawa, Japan

[21] Appl. No.: 37,710

[22] Filed: Mar. 25, 1993

Related U.S. Application Data

[63] Continuation of Ser. No. 723,183, Jun. 28, 1991.

[30] Foreign Application Priority Data

Jun. 29, 1990 [JP] Japan ................. 2-68492

[51] Int. Cl.⁵ .................... H02K 3/48
[52] U.S. Cl. ..................... 310/214; 310/45
[58] Field of Search .......... 310/214, 43, 45, 111

[56] References Cited

U.S. PATENT DOCUMENTS

| 917,138 | 4/1909 | Robinson | 310/214 |
|---|---|---|---|
| 1,042,408 | 10/1912 | Dearborn | 310/214 |
| 2,451,633 | 10/1948 | Perrigo | 310/214 |
| 3,447,009 | 5/1969 | Keuth | 310/214 |
| 4,025,840 | 5/1977 | Brissey | 310/214 |

FOREIGN PATENT DOCUMENTS

| 0022379 | 1/1981 | European Pat. Off. | 310/214 |
|---|---|---|---|
| 0022345 | 2/1982 | Japan | 310/214 |
| 0046643 | 3/1982 | Japan | 310/214 |
| 0019138 | 2/1983 | Japan . | |
| 0022554 | 2/1983 | Japan . | |
| 0018548 | 2/1984 | Japan . | |
| 0175350 | 10/1984 | Japan . | |
| 59-220039 | 12/1984 | Japan . | |
| 0077030 | 4/1987 | Japan | 310/214 |
| 0161834 | 7/1988 | Japan | 310/214 |
| 2-26243 | 7/1991 | Japan | 310/214 UX |
| 0657523 | 4/1979 | U.S.S.R. | 310/214 |

OTHER PUBLICATIONS

Powder Metallurgy, vol. 27, No. 3, pp. 160–162, entitled "Magnetic slot wedges for electrical machines," by B. Drys and A. Kowalski, dated 1984 (no month).

IEEE Transactions on Magnetics, vol. MAG-18, No. 6, entitled "A Research of Efficiency Improvement by Means of Wedging with Soft Ferrite in Small Induction Motors," by Akio Kaga, Yoshihisa Anazawa, Hideo Akagami, Seiji Watabe and Motohiko Makino, dated Nov. 1982.

*Primary Examiner*—R. Skudy
*Attorney, Agent, or Firm*—Limbach & Limbach

[57] ABSTRACT

A magnetic slot wedge inserted in each slot of a stator core of a dynamo-electric machine so as to close an opening of each slot for preventing coils embedded in each slot from getting out of each slot is disclosed. The slot wedge includes a first thin non-magnetic sheet such as a polyester film having the thickness of several ten microns or an aromatic aramid paper, an amorphous sheet bonded to one of two faces of the first non-magnetic sheet opposite the other face facing a coil side in the condition that the wedge is inserted in each slot, and a second thin non-magnetic sheet bonded to the amorphous sheet so as to cover it. Each non-magnetic sheet has such dimensions that each non-magnetic sheet is projected from both ends and both side edges of the amorphous sheet.

2 Claims, 17 Drawing Sheets

MAGNETIC SLOT WEDGES FOR DYNAMO-ELECTRIC MACHINES

This is a continuation of co-pending application Ser. No. 07/723,183 filed on Jun. 28, 1991.

BACKGROUND OF THE INVENTION

This invention relates to magnetic slot wedges inserted in slots of a stator core of a dynamo-electric machine for preventing coils embedded in the respective slots from getting out of them, and more particularly to such magnetic wedges comprising an insulating material and a magnetic material combined with the insulating material.

Magnetic wedges are usually inserted in respective slots of a stator core for the purpose of improving the efficiency and power factor of electric motors and reducing noise due to electromagnetic vibration. The insertion of the wedge in each slot corrects the magnetic unbalance between each slot opening of the stator core and core teeth and accordingly, reduces the magnetic flux distortion of an air gap between the rotor and stator, resulting in improvements of motor characteristics.

Since a slot wedge at an initial stage of the prior art comprises a material formed from iron powder by way of the compression molding, it has a relatively large thickness. The motor characteristics can usually be improved in proportion to an amount of coil embedded in each slot of the stator core. However, the prior art wedge having the relatively large thickness reduces an effective cross sectional area of each slot, offsetting the effect of inserting the wedge. Further, the strength of the wedge is low such that the wedge is likely to be broken by an external shock in the step that it is inserted into the slot or in the state that it has been inserted in the slot. To overcome these disadvantages, Japanese Laid-open (kokai) Utility Model Registration Application No. 59-18548 discloses a thin magnetic wedge. This thin magnetic wedge comprises a thin insulative sheet member and a magnetic powder such as ferrite coated on the thin insulative sheet member to be integrated with it. However, a large automated expensive equipment is required for coating the magnetic powder on the thin insulative sheet member. Further, when the magnetic powder is coated on the insulative sheet member too thick, the magnetic layer is removed from the insulative sheet member in a step of inserting the wedges in the slots. Additionally, since the face of the insulative sheet member on which the magnetic powder is coated faces the coil side within the slot, the voltage withstanding property of the coil is reduced and further, the coils are damaged by the magnetic layer.

Japanese Laid-open (kokai) Patent Application Nos. 58-19138, 58-22554 and 59-175350 each disclose magnetic wedges employing amorphous alloys. In these magnetic wedges, amorphous sheets are laminated so that the lamination has a trapezoidal longitudinal cross section. Each sheet is bonded to an adjacent sheet by a bonding agent or a synthetic resin layer containing a magnetic powder is interposed between each sheet and its adjacent one so that an integral construction is obtained. Furthermore, a magnetic wedge is disclosed which is made by molding an amorphous magnetic fiber with an organic bonding agent into a predetermined integral shape. However, to make these laminated magnetic wedges, many kinds of amorphous sheets having different width are required and each of many amorphous sheets needs to be bonded to its adjacent sheet. Consequently, many manufacturing steps are required and a sufficient strength of the magnetic wedge cannot be secured by the bond strength. Further, since the magnetic wedge is integrally formed by bonding each sheet to its adjacent one, by interposing the synthetic resin layer between each sheet and its adjacent one or by molding the amorphous magnetic fiber with the organic bonding agent, the volume of the magnetic wedge is increased, resulting in worsening the motor characteristics and increasing the motor size.

SUMMARY OF THE INVENTION

Therefore, a primary object of the present invention is to provide a double laminated sheet type magnetic slot wedge for dynamo-electric machines which is thinned so that the space occupied by the wedge within each slot can be minimized and readily manufactured.

A second object of the invention is to provide a double laminated sheet type magnetic slot wedge for dynamo-electric machines which has a sufficient strength not to be likely to be removed from the non-magnetic sheet integrally holding it in a manufacturing step of automatic insertion of the wedge into each slot.

A third object of the invention is to provide a double laminated sheet type magnetic slot wedge for dynamo-electric machines wherein the coils within the slots can be prevented from being damaged when the wedge is inserted into each slot.

A fourth object of the invention is to provide a double laminated sheet type magnetic slot wedge for dynamo-electric machines which can improve the voltage withstanding property of the coils.

The present invention provides a double laminated sheet type magnetic slot wedge inserted in each slot of a stator core of a dynamo-electric machine so as to close an opening of each slot for preventing coils embedded in each slot from getting out of each slot, the wedge comprising a double laminated sheet type thin non-magnetic sheet and an amorphous sheet bonded to one of two faces of the non-magnetic sheet opposite the other face thereof facing a coil side in a condition that the wedge is inserted in each slot.

In accordance with another aspect, the present invention provides a magnetic slot wedge inserted in each slot of a stator core of a dynamo-electric machine so as to close an opening of each slot for preventing coils embedded in each slot from getting out of each slot, the wedge comprising a first thin non-magnetic sheet, an amorphous sheet bonded to one of two faces of the first non-magnetic sheet opposite the other face thereof facing a coil side in the condition that the wedge is inserted in each slot, and a second thin non-magnetic sheet bonded to the amorphous sheet so as to cover the same.

Other objects will become obvious upon understanding of the illustrative embodiment about to be described or will be indicated in the appended claims. Various advatanges not referred to herein will occur to one skilled in the art upon employment of the invention in practice.

DESCRIPTION OF THE PREFERRED EMBODIMENTS

Figure 1:
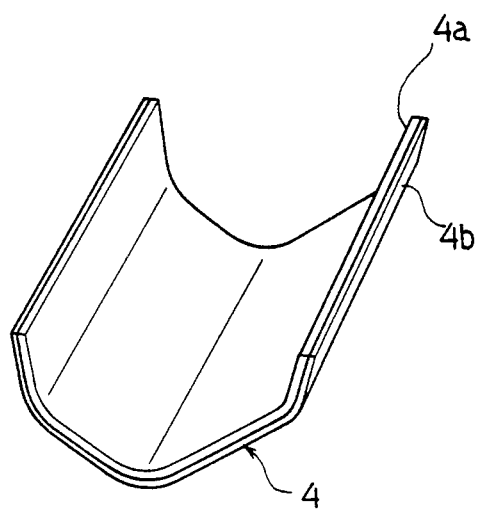
FIG. 1 is a perspective view of the magnetic wedge of a first embodiment in accordance with the present invention.
Figure 2:
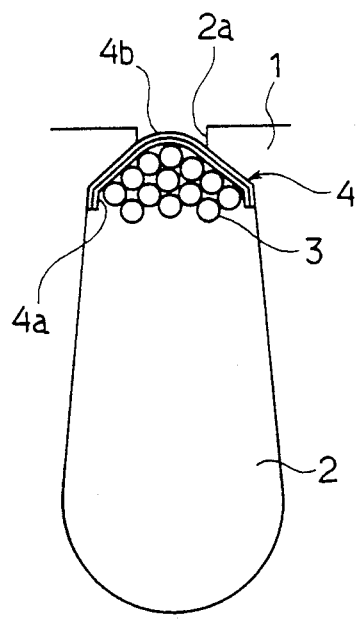
FIG. 2 is a partial sectional view of a stator core of a dynamo-electric machine with the magnetic wedge inserted in a slot.

A first embodiment of the present invention will now be described with reference to FIGS. 1 to 4 of the accompanying drawings. A dynamo-electric machine comprises a stator (not shown) including a stator core 1. The stator core 1 has a plurality of slots 2 in which coils 3 are embedded. Since the slots 2 are similar with one another, one of such slots 2 is shown and will be described. A magnetic wedge 4 is inserted in the slot 2 for preventing the coils 3 from getting out of it. The magnetic wedge 4 comprises a flexible non-magnetic sheet 4a with the thickness of several ten microns such as a polyester film or an aromatic aramid paper conventionally employed in electric motors as a material of the wedge and an amorphous sheet or tape 4b bonded to one side face of the non-magnetic sheet 4a to be integrated with it. The film thickness of the amorphous sheet 4b ranges between several $\mu m$ and several ten $\mu m$. The amorphous sheet 4b employed in the embodiment includes an alloy consisting of 75%-a first material composed of 88%-Co, 6%-Fe, 4%-Ni and 2%-Nb and 25%-a second material composed of 40%-Si and 60%-B. As shown in FIG. 2, the magnetic wedge 4 is inserted in the slot 2 so as to close an opening 2a of it in order that the coil 3 is prevented from getting out from the opening 2a of the slot 2. The direction of the curvature of the magnetic wedge 4 is determined so that the amorphous sheet 4b of the wedge is positioned at the side opposite the coil 3. Each of the non-magnetic sheet 4a and the amorphous sheet 4b has a dimension approximately as large as the longitudinal length of the slot 2.

Since the film thickness of the amorphous sheet 4b is as small as ranging between several microns and several ten $\mu m$, the amount of coil 3 embedded in the slot 2 is nearly as large as in the prior art wherein only the non-magnetic sheet is employed and further, the wedge 4 has a conventional magnetic effect. Since the magnetic wedge 4 is formed from the non-magnetic sheet 4a and the amorphous sheet 4b bonded to the non-magnetic sheet 4a into a thin sheet, it can be easily applied to conventional machines for automatically inserting the wedges in the respective slots. Further, the amorphous sheet is bonded to one side face of the nonmagnetic sheet 4a but the magnetic powder is not coated on it, and the magnetic wedge 4 is formed into a bonded one-layer structure. Consequently, the possibility of occurrence of removal between both sheets 4a, 4b is exceedingly low and therefore, a sufficient strength can be obtained. Additionally, since the amorphous sheet member 4a is positioned at the side opposite the coil 3, the voltage withstanding property of the coil 3 can be improved, and the coil 3 can be prevented from being damaged by the magnetic layer since the coil is in contact with the thin nonmagnetic sheet 4a.

TABLE 1 shows characteristics of a four pole 2.2 kW motor to which both the magnetic wedge in accordance with the present invention and the conventional nonmagnetic wedge are applied individually. TABLE 1 shows that the efficiency is improved by 1.5% from 81.0 to 82.5%. Further, the load loss is reduced approximately by 50 W. This reduction in the load loss results from the reduction in the harmonic loss in the gap between the stator and rotor.

TABLE 1

| Motor characteristics (200V-60Hz-100% load characteristics) | | |
| --- | --- | --- |
| | Application of non-magnetic wedge | Application of Magnetic wedge of the invention |
| Current (A) | 8.84 | 8.77 |
| Efficiency (%) | 81.0 | 82.%/ |
| Power factor (%) | 88.7 | 87.7 |
| Slip (%) | 4.72 | 4.79 |
| Load loss (W) | 516 | 467 |

Figure 3:
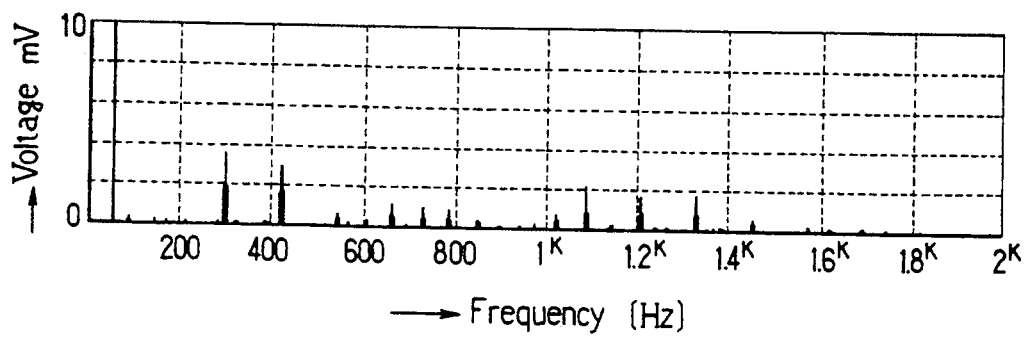
FIGS. 3 and 4 are graphs showing an amount of magnetic flux interlinkage of a non-magnetic wedge and an amount of magnetic flux interlinkage of the magnetic wedge of the present invention, respectively.
Figure 4:
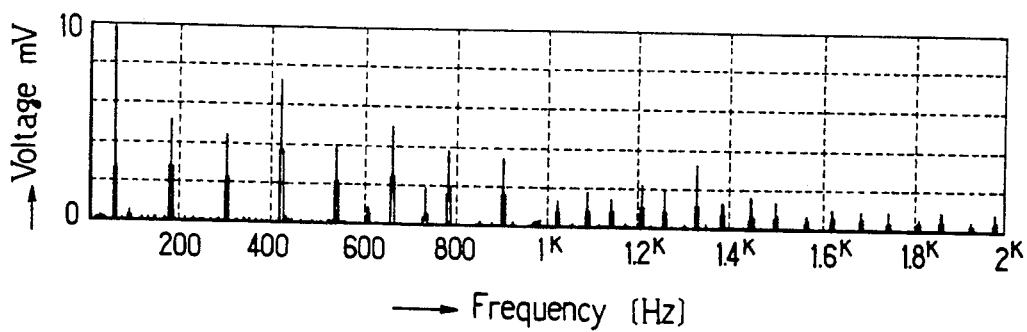

FIGS. 3 and 4 show the frequency characteristics of the magnetic fluxes linking the conventional non-magnetic wedge and the magnetic wedge of the invention respectively with a search coil wound around each wedge. As obvious from FIGS. 3 and 4, the magnetic flux linkage is more conspicuous in the magnetic wedge of the invention than in the conventional non-magnetic wedge in each frequency band and particularly, in the frequency bands below 1 kHz. This means that the high frequency loss in the gap between the stator and rotor is reduced.

The amorphous sheet employed in the invention may be formed from every amorphous substance such as iron, cobalt, nickel or the like.

In forming the magnetic wedge 4, concave and convex portions may be formed on one side surface of the non-magnetic sheet 4a by way of shot blasting or embossing and then, the amorphous sheet 4b may be bonded to the concave and convex surface of the non-magnetic sheet 4a such that both sheets are firmly stuck together.

Figure 5:
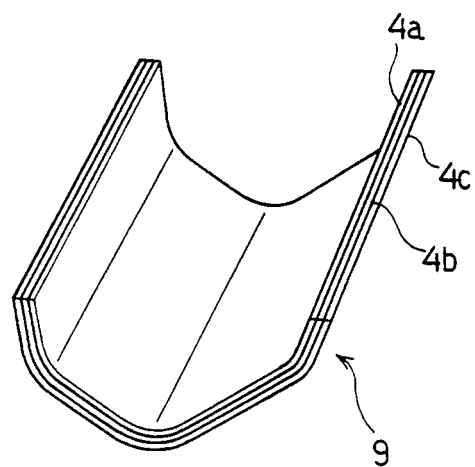
FIG. 5 is a perspective view of the magnetic wedge of a second embodiment.
Figure 6:
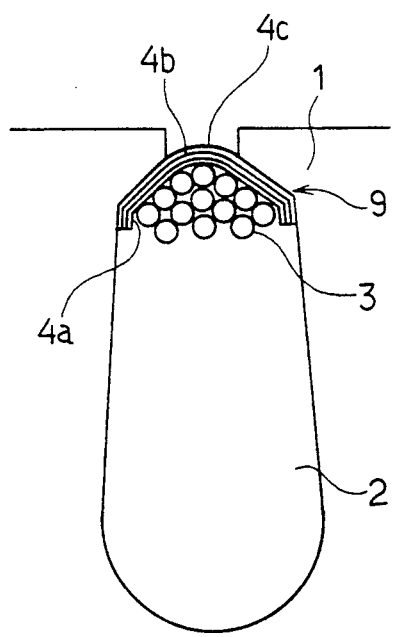
FIG. 6 is a partial sectional view of the stator core with the magnetic wedge of the second embodiment inserted in the slot.

FIGS. 5 and 6 illustrate a second embodiment of the invention. The magnetic wedge 9 of the second embodiment comprises the first thin non-magnetic sheet 4a formed from the same material as in the first embodiment and the amorphous sheet 4b bonded to the first non-magnetic sheet 4a. Additionally, the magnetic wedge 9 includes a second thin non-magnetic sheet 4c bonded to the amorphous sheet 4b so that it is covered by the second non-magnetic sheet 4c. The second non-magnetic sheet 4c is formed from the same material as of the first non-magnetic sheet 4a and slightly thinner than the first non-magnetic sheet 4a. The magnetic wedge 9 thus formed is inserted into each stator core slot 2 so that the second thinner non-magnetic sheet 4c is positioned at the slot opening side with the first non-magnetic sheet 4a facing the coil 3, as shown in FIG. 6.

In accordance with the above-described magnetic wedge 9, the amorphous sheet 4b can effectively be prevented from being removed from the first non-magnetic sheet 4a by the second non-magnetic sheet 4c in the automatic insertion step. Further, since the second non-magnetic sheet 4c is rendered thinner, the thickness of the first non-magnetic sheet 4a can be increased, resulting in improvement of the voltage withstanding property of the coil 3. The second non-magnetic sheet 4c may or may not be thinner than the first non-magnetic sheet 4a.

Figure 7:
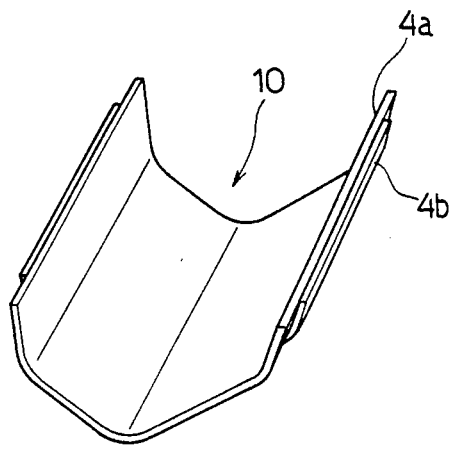
FIG. 7 is a perspective view of the magnetic wedge of a third embodiment.
Figure 8:
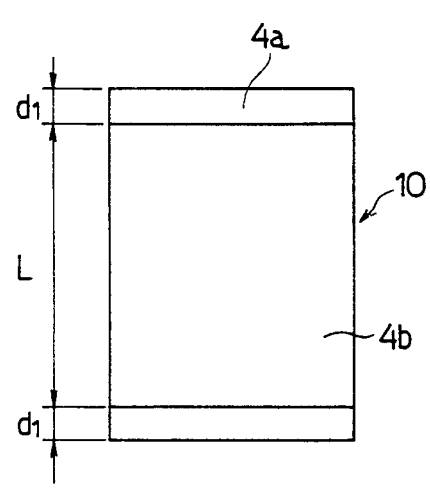
FIG. 8 is a developed plan view of the magnetic wedge.

FIGS. 7 and 8 illustrate a third embodiment of the invention. The longitudinal length of the amorphous sheet 4b of the magnetic wedge 10 is approximately equal to the longitudinal length L of the slot 2. The non-magnetic sheet 4a has such a longitudinal length that both ends of the member 4b are projected from the respective ends of the slot 2 by a suitable length d1. Since the insulation distance between both ends of the amorphous sheet 4b inferior in the electrical insulation property and the coil 3 is increased, the coil 3 can be further prevented by the amorphous sheet 4b from being damaged. Consequently, the voltage withstanding property of the coil 3 can be improved.

Figure 9:
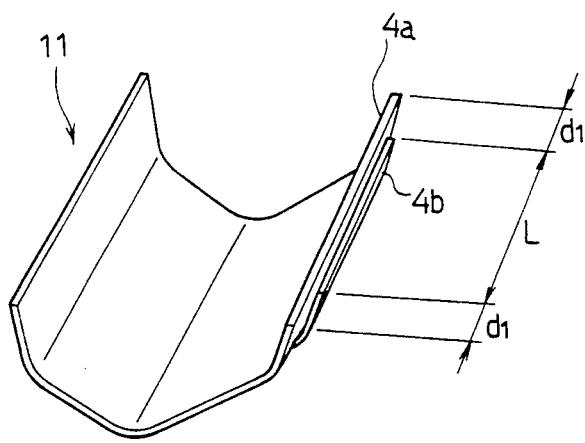
FIGS. 9 and 10 are views similar to FIGS. 7 and 8 showing the magnetic wedge of a fourth embodiment, respectively.
Figure 10:
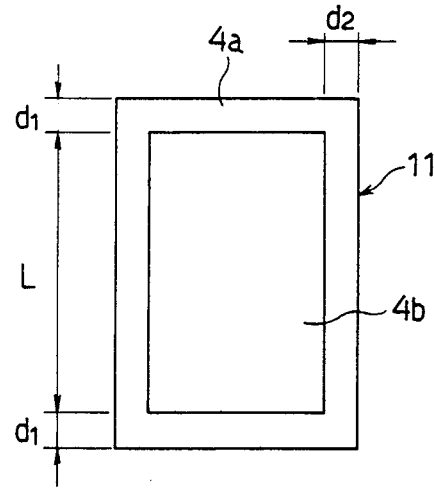

FIGS. 9 and 10 illustrate a fourth embodiment of the invention. The magnetic wedge 11 differs from the wedge 10 of the third embodiment shown in FIG. 8 only in that both ends of the non-magnetic sheet 4a of the magnetic wedge 11 are projected from the respective edges of the amorphous sheet 4b by a suitable length d2.

Figure 11:
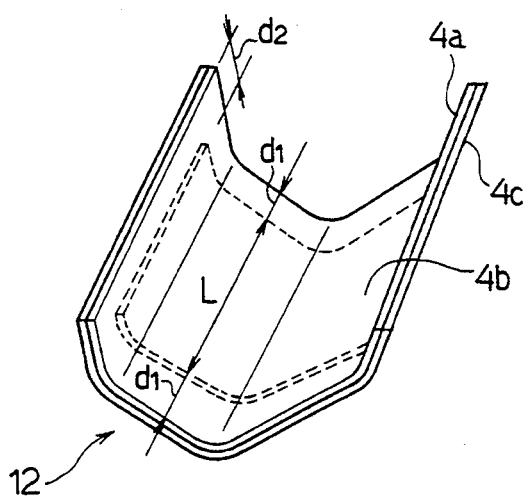
FIG. 11 is a view similar to FIG. 7 showing the magnetic wedge of a fifth embodiment.

FIG. 11 illustrates a fifth embodiment of the invention. The magnetic wedge 12 differs from the wedge 9 of the second embodiment shown in FIG. 5 in that each of the first and second non-magnetic sheets 4a, 4c has such dimensions that each of them is projected from both ends and both side edges of the amorphous sheet 4b by the respective lengths d1 and d2. The same effect can be achieved in the magnetic wedges 11, 12 as in the wedge 10 of the third embodiment. Additionally, a sufficient bonding effect can be achieved between the first and second non-magnetic sheets 4a, 4c projected from both ends and both side edges of the amorphous sheet 4b.

Figure 12:
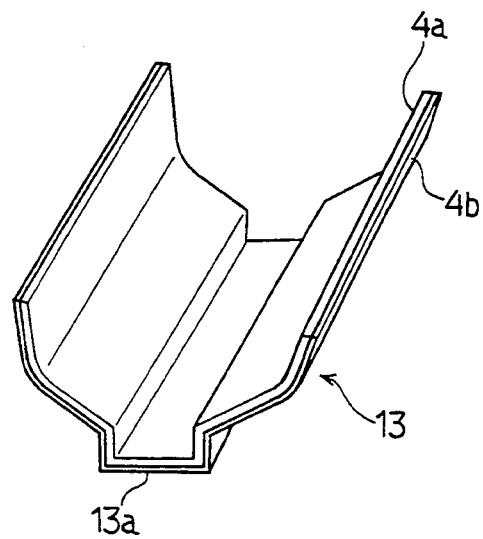
FIGS. 12 and 13 are views similar to FIGS. 1 and 2 showing the magnetic wedge of a sixth embodiment, respectively.
Figure 13:
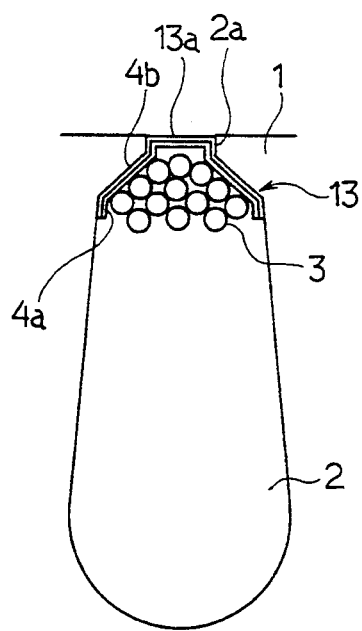

FIGS. 12 and 13 illustrate a sixth embodiment. The magnetic wedge 13 is the same as that in the first embodiment except for a generally U-shaped bent portion or a projection 13a formed in its central portion. The projection 13a is closely fitted in the slot opening 2a when the magnetic wedge 13 is inserted in the slot 2 of the stator core 1. Since the projection 13a is positioned in the opening 2a of the slot 2 so as to be planar with the outer periphery of the stator core 1, uniformity in the magnetic flux distribution in the gap between the stator and the rotor can be enhanced.

Figure 14:
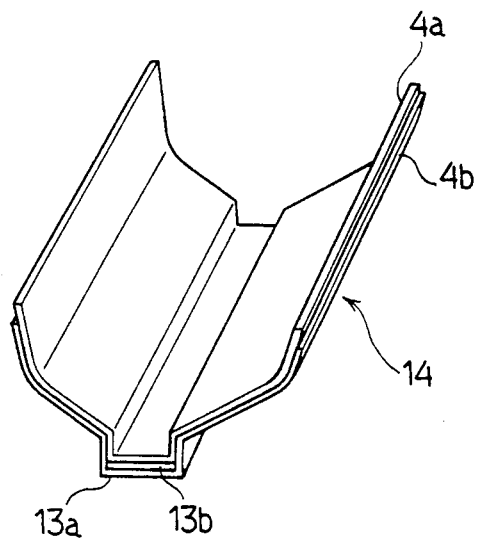
FIGS. 14 and 15 are views similar to FIGS. 1 and 2 showing the magnetic wedge of a seventh embodiment.
Figure 15:
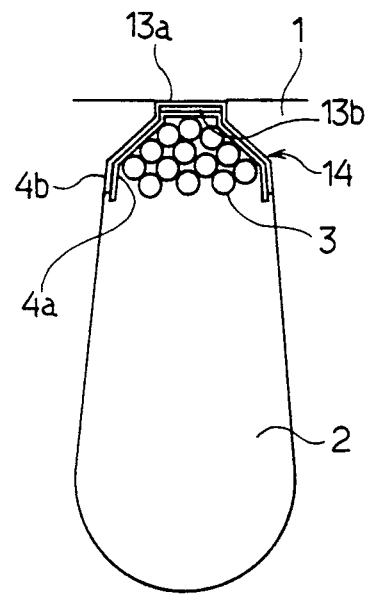

In a seventh embodiment shown in FIGS. 14 and 15, an auxiliary amorphous lamina 13b is inserted in the top inside of the U-shaped projection 13a of the magnetic wedge 14. Since the magnetic path cross sectional area of the projection 13a is increased, the magnetic property against the harmonic magnetic flux in the portion of the projection 13a can be improved by addition of the auxiliary amorphous lamina 13b, which reduces an amount of the harmonic component transferred to the rotor side. The auxiliary amorphous lamina 13b may be bonded to either the outside or the inside of the projection 13a.

Figure 16:
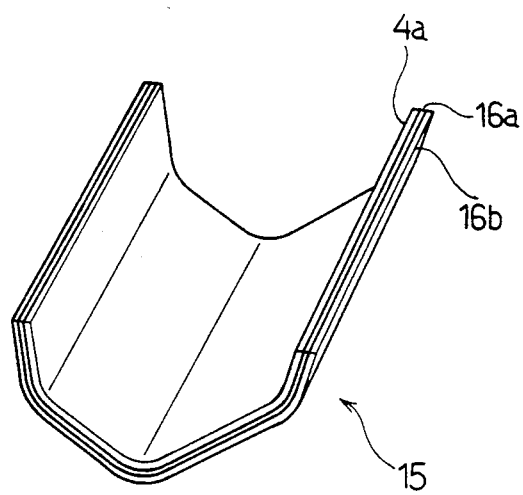
FIG. 16 is a view similar to FIG. 1 showing the magnetic wedge of an eighth embodiment.

FIG. 16 shows an eighth embodiment as a modified form of the first embodiment. Two amorphous sheets 16a and 16b different in the magnetic permeability and the non-magnetic sheet 4a are laminated so as to integrally form the wedge of the three-layer construction. The magnetic permeability of the wedge can advantageously be determined in a wide range by selecting the value of the magnetic permeability of each amorphous sheet 16a, 16b.

Figure 17:
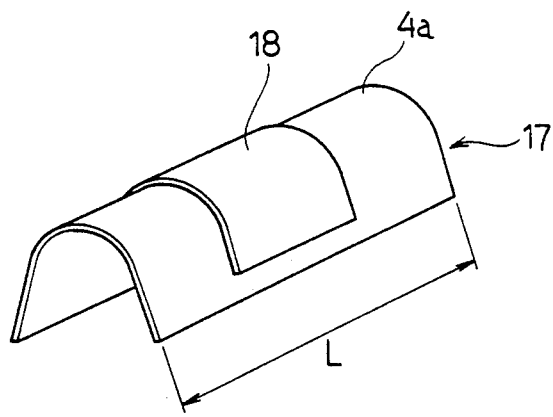
FIG. 17 is a view similar to FIG. 1 showing the magnetic wedge of a ninth embodiment.

Referring now to FIG. 17 showing a ninth embodiment, the axial dimension L of the non-magnetic sheet 4a of the magnetic wedge 17 is approximately equal to that of the stator core 1 and the axial dimension of the amorphous sheet 18 is set to a value several times as small as that of the stator core.

Figure 18:
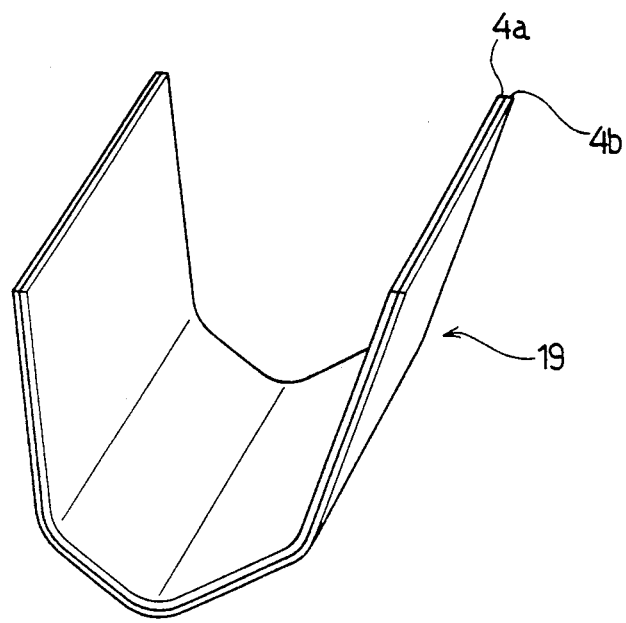
FIGS. 18 and 19 are views similar to FIGS. 1 and 2 showing the magnetic wedge of a tenth embodiment.
Figure 19:
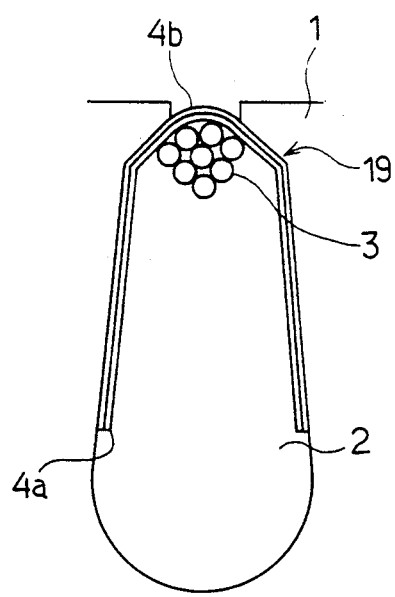

FIGS. 18 and 19 illustrate a tenth embodiment. The magnetic wedge 19 is formed by bonding the non-magnetic sheet 4a and the amorphous sheet 4b in the same manner as in the first embodiment. Both side ends of the wedge 19 are extended so that the length of each extended side is approximately equal to that of each of opposed sides of the slot 2. Since most part of the coil 3 embedded in the slot 2 is covered by the amorphous sheet 4b in the condition that the wedge 19 is inserted in the slot 2, an electric circuit including the coil 3 shows high impedance against a surge current flowing into the coil 3. Thus, the surge absorbing effect can be obtained.

Figure 20:
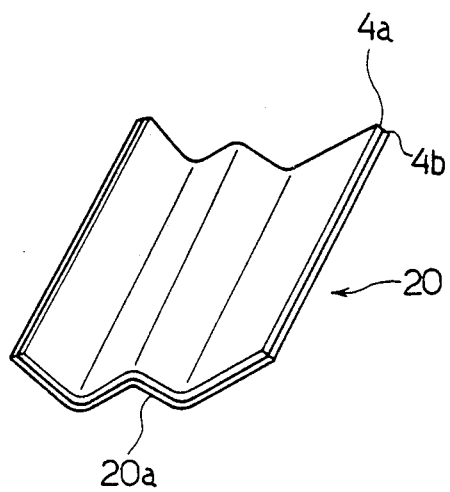
FIGS. 20 and 21 are views similar to FIGS. 1 and 2 showing the magnetic wedge of an eleventh embodiment.
Figure 21:
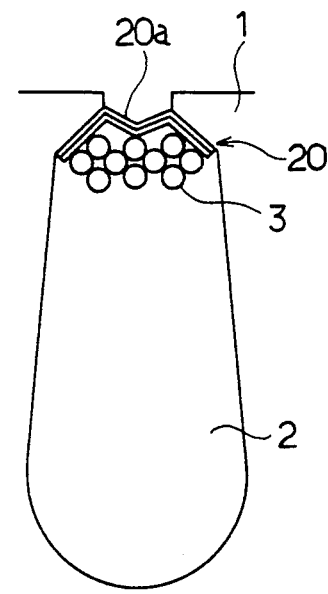

Referring to FIGS. 20 and 21 illustrating an eleventh embodiment, the magnetic wedge 20 comprises the non-magnetic sheet 4a and the amorphous sheet 4b laminated one over the other and has a generally W-shaped cross section with a central gorge portion 20a. The magnetic wedge 20 is inserted in the slot 2 of the stator core 1 as shown in FIG. 21 such that the wedge 20 is securely held in the slot 2 by an elastic restoring force exerted by the gorge portion 20a.

Figure 22:
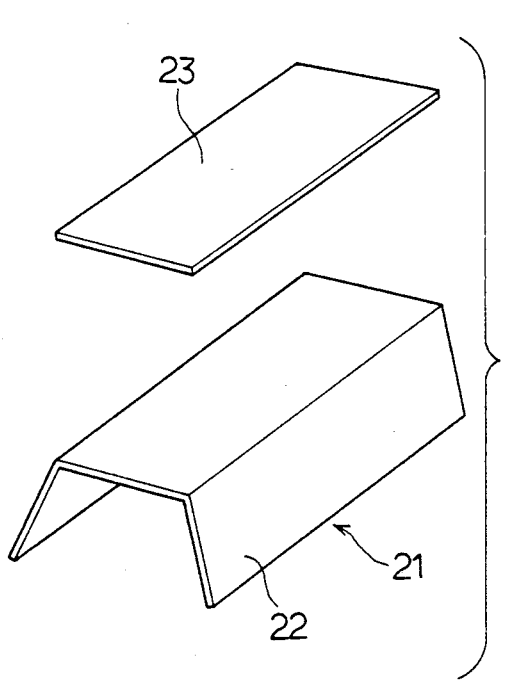
FIG. 22 is an exploded perspective view of the magnetic wedge of a twelfth embodiment.
Figure 23:
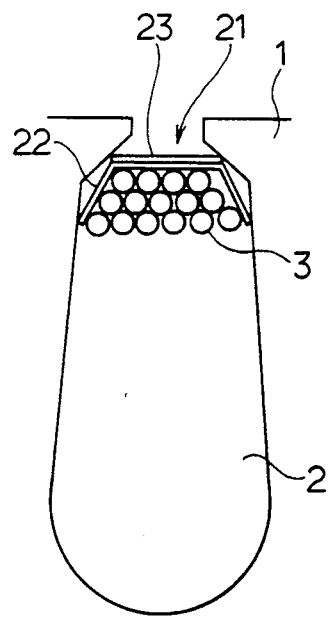
FIG. 23 is a partial sectional view of the stator core with the magnetic wedge of the twelfth embodiment inserted in the slot.

The magnetic wedge 21 shown in FIGS. 22 and 23 as a twelfth embodiment which is a modified form of the first embodiment comprises a generally U-shaped non-magnetic sheet 22 and a rectangular amorphous lamina 23 whose width is approximately equal to the dimension between inside edges of the opening 2a of the slot 2 of the stator core 1. First, only the non-magnetic sheet 22 is inserted into the slot 2 and then, the amorphous sheet 23 is inserted into the slot 2 so as to be disposed on the top of the non-magnetic sheet 22, as shown in FIG. 23. Subsequently, both sheets 22, 23 may be varnished so as to be joined to each other. Alternatively, a bonding material layer may previously be formed on each member 22, 23 and both members may be bonded to each other by means of heating when laid one upon the other in the slot 2.

Figure 24:
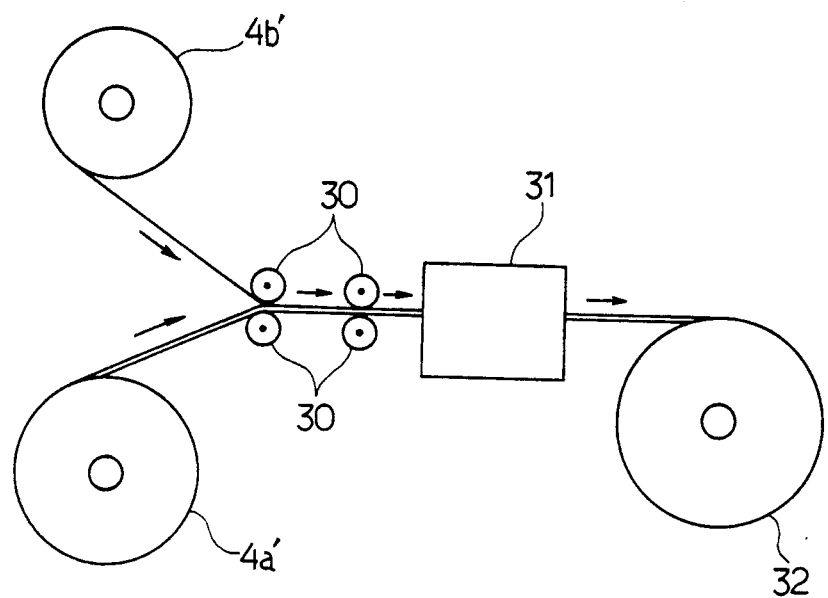
FIGS. 24 to 30 show different apparatuses for bonding a plastic sheet and an amorphous sheet for the magnetic wedge.

A method of making the magnetic wedge in accordance with the invention will now be described with an emphasis laid upon joint of the non-magnetic sheet and the amorphous sheet. Referring to FIG. 24, an amorphous sheet strip 4b' formed into the amorphous sheet 4b and a plastic sheet strip 4a' formed into the non-magnetic sheet 4a are rolled individually. A bonding agent is previously applied to one of two sides of each strip 4a', 4b'. Both strips 4a', 4b' are unrolled by guide rollers and laid one upon the other so that the bonding faces of the respective strips 4a', 4b' are in contact with each other. Then, the strips thus superposed are fed into a bonding apparatus 31. Heat is applied to the strips 4a', 4b' in the process that they pass through the bonding apparatus 31 such that they are bonded to each other, and the bonded strips are rolled up and stored as the wedge sheet strip 32. The wedge sheet strip 32 is unrolled and cut into pieces with suitable dimensions when needed. Each cut piece is formed into the U-shaped magnetic wedge 4 as shown in FIG. 1.

Figure 25:
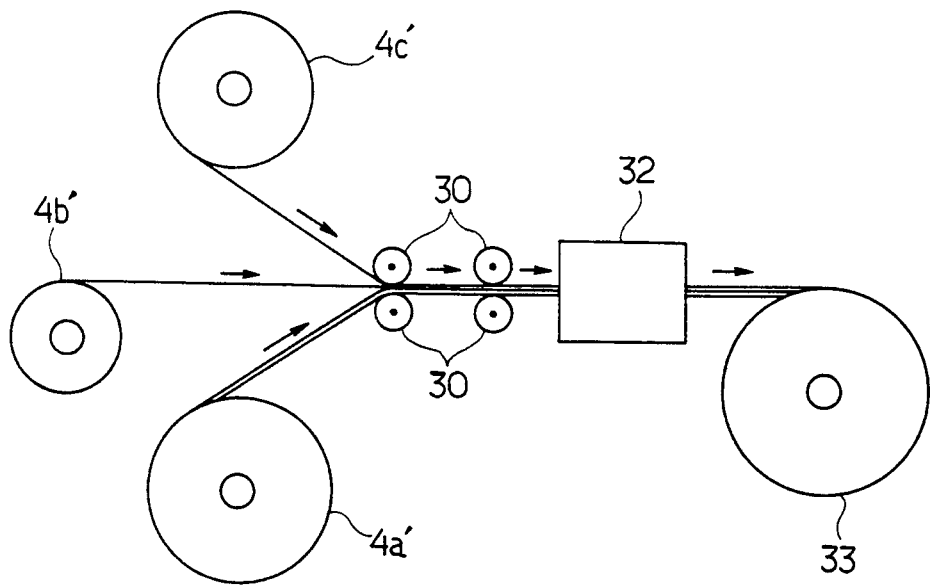

The apparatus shown in FIG. 25 is suitable for making the magnetic wedge 9 shown in FIG. 5. A rolled second plastic sheet strip 4c' as the material of the second non-magnetic sheet 4c shown in FIG. 5 is added to the apparatus. The rolled first and second plastic sheet strips 4a', 4c' are unrolled by the guide rollers 30 and the rolled amorphous sheet strip 4b' is unrolled so as to be interposed between the first and second plastic sheet strips 4a', 4c', obtaining a magnetic wedge strip 33.

Figure 26:
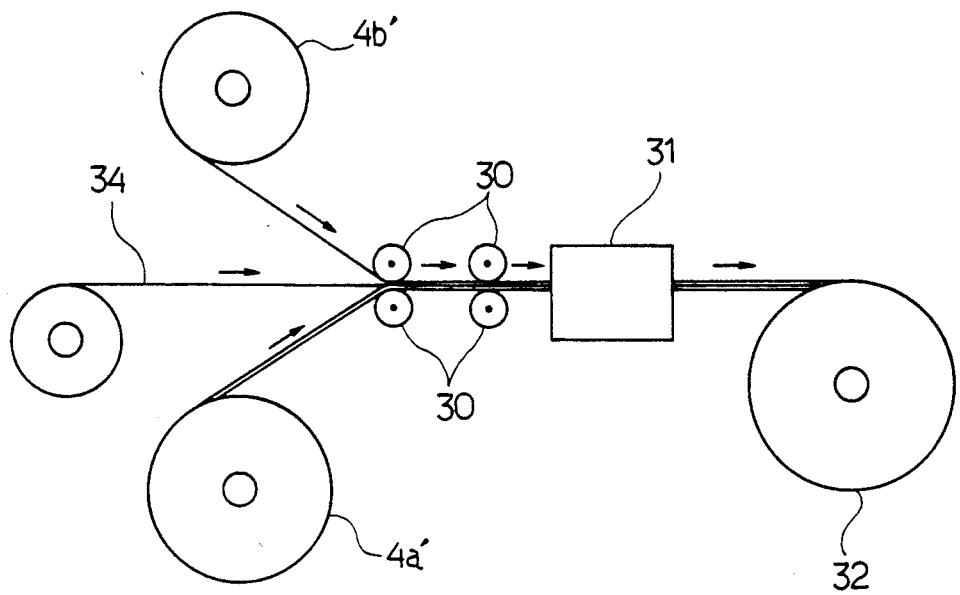

The apparatus shown in FIG. 26 has a rolled bonding strip 34 with both sides to which the bonding agent is applied. The bonding strip 34 is interposed by the guide rollers 30 between the amorphous sheet strip 4b' and the plastic sheet strip 4a' to each of which the bonding agent is not applied. Consequently, a three-layer magnetic wedge sheet strip 32 is obtained.

Figure 27:
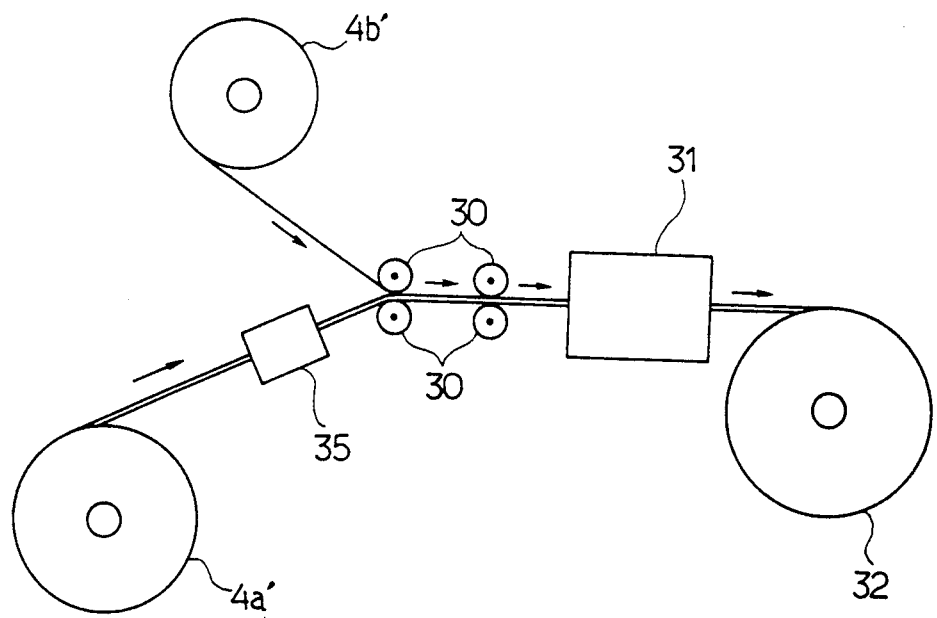

The apparatus shown in FIG. 27 includes a bonding agent applying apparatus 35. When the plastic sheet strip 4a' and the amorphous sheet strip 4b' pass through the apparatus 35, the bonding agent is applied by the apparatus 35 to at least one of the plastic and amorphous sheet strips 4a', 4b' to neither of which the bonding agent is previously applied.

Figure 28:
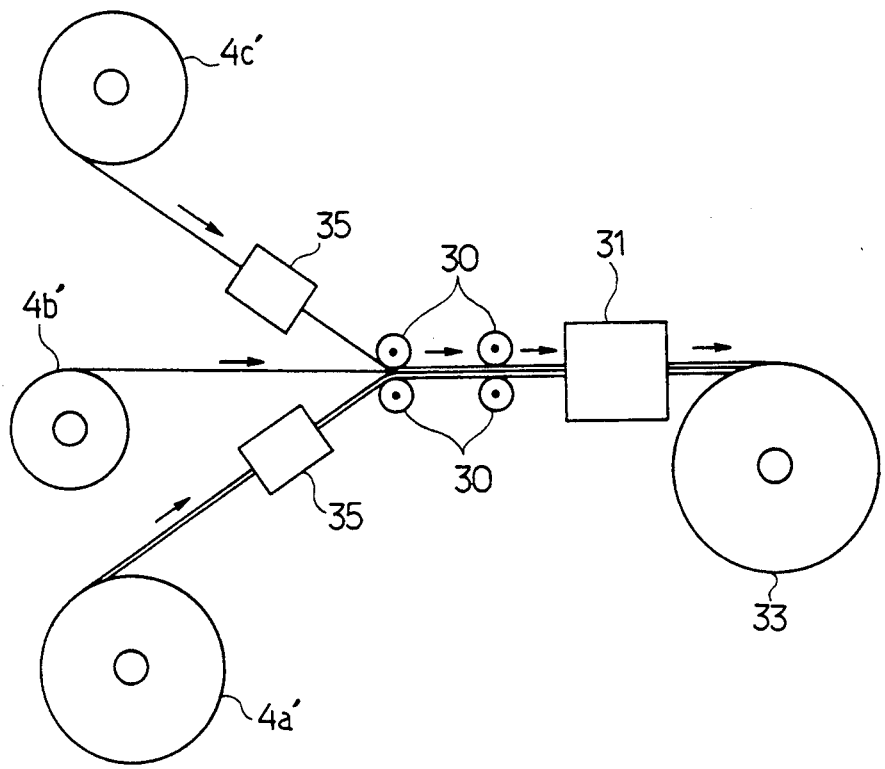

The apparatus shown in FIG. 28 is a modified form of the apparatus shown in FIG. 25. The bonding agent applying apparatus is disposed so that the rolled first and second plastic sheet strips 4a', 4c' pass through it.

Figure 29:
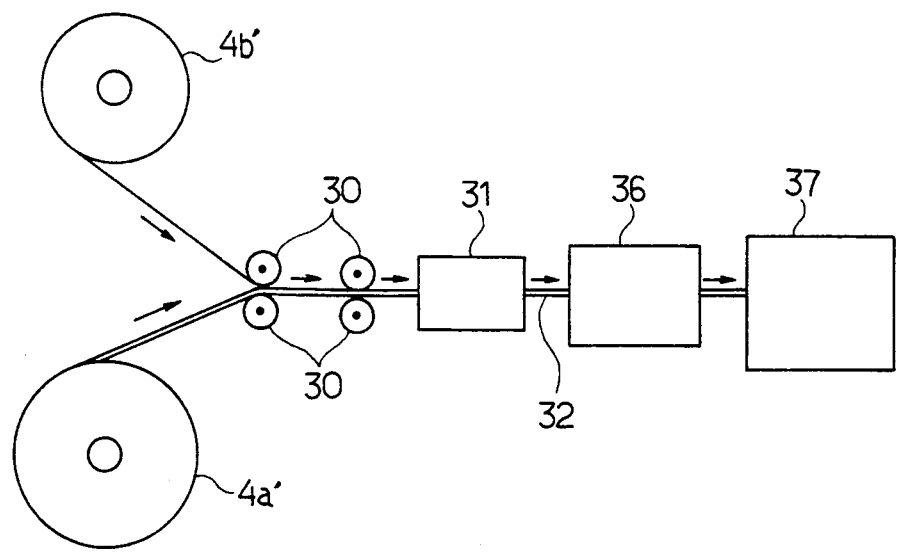

The apparatus shown in FIG. 29 is a modified form of the apparatus shown in FIG. 24. A shaping apparatus 36 and a cutting apparatus 37 are provided following the bonding apparatus 35. The wedge sheet strip 32 fed from the bonding apparatus 35 is directly formed by the shaping apparatus 36 into the U-shape as shown in FIG. 1 and cut into pieces by the cutting apparatus 37 without being rolled up. In each apparatus shown in FIGS. 25-28, the shaping apparatus 36 and the cutting apparatus 37 may also be provided following the bonding apparatus in the manner as described above. Additionally, the order of disposition of the shaping apparatus 36 and the cutting apparatus 37 may be reversed in the apparatus shown in FIGS. 25-28.

Figure 30:
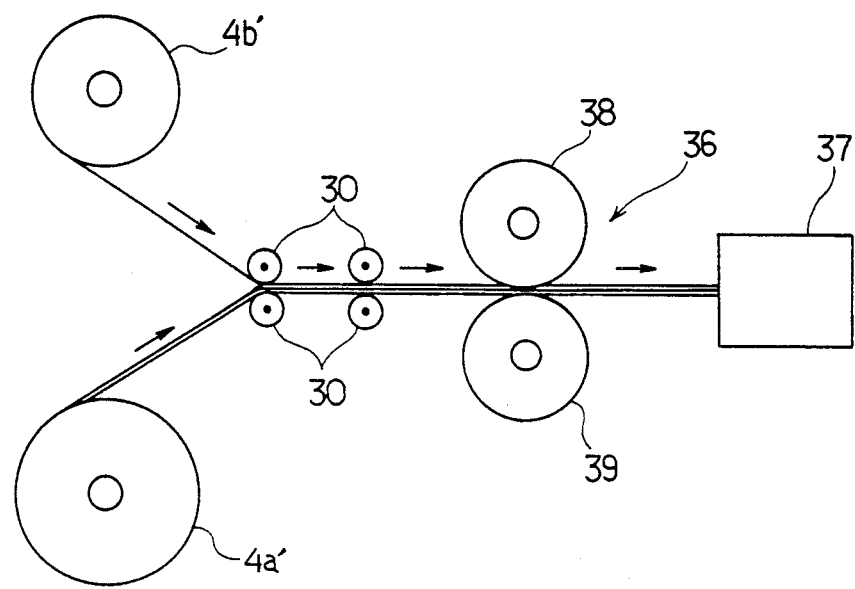
Figure 31A:
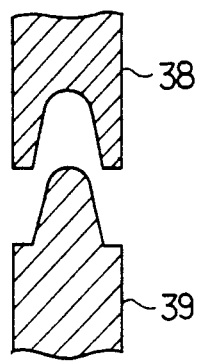
FIGS. 31(a) to 31(g) show different forming rollers having different configurations.
Figure 31B:
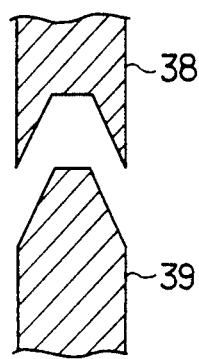
Figure 31C:
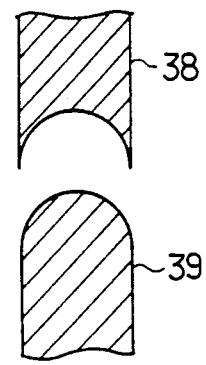
Figure 31D:
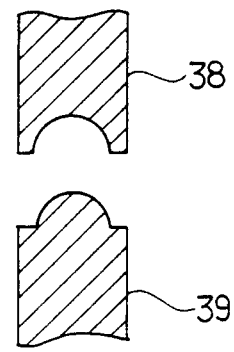
Figure 31E:
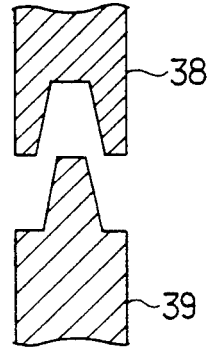
Figure 31F:
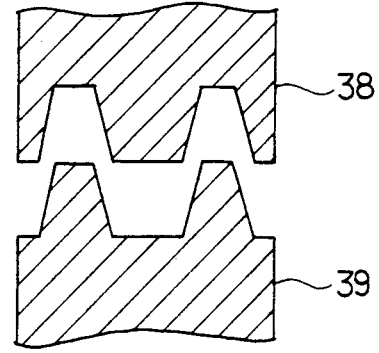
Figure 31G:
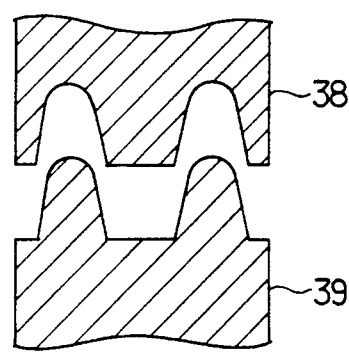

FIG. 30 illustrates one concrete form of the shaping apparatus 36 shown in FIG. 29. The shaping apparatus 36 comprises two forming rollers 38 and 39 heated by a heater (not shown). The forming roller 38 has a female die 38a and the other forming roller 39 a male die 39a. The wedge sheet strip 32 fed from the bonding apparatus 31 is formed into the curved shape as shown in FIG. 1 when it passes through the heated forming rollers 38, 39. The wedge sheet strip 32 is then fed to the cutting apparatus. The dies of the respective forming rollers 38, 39 may take various configurations as shown in FIGS. 31(a) to 31(g).

Figure 32:
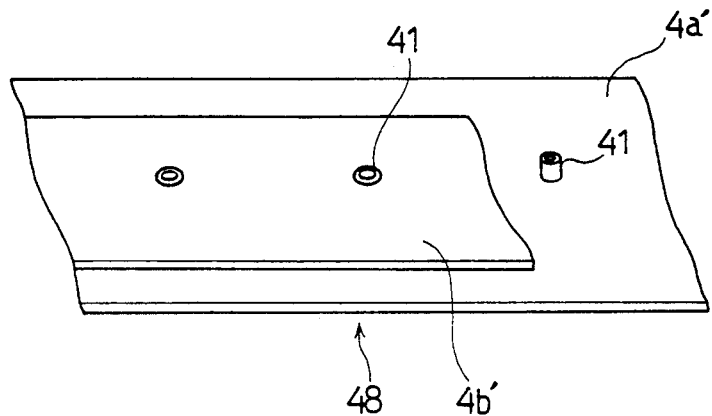
FIG. 32 is a perspective view of a wedge strip formed by caulking the plastic sheet and the amorphous sheet.
Figure 33:
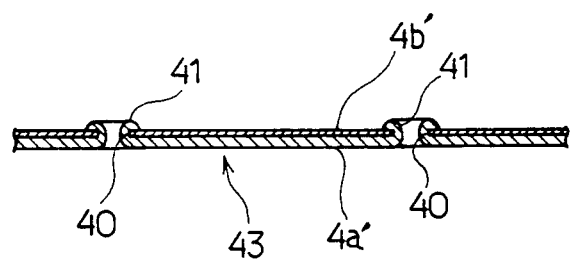
FIG. 33 is a longitudinal section of the wedge strip in FIG. 32.
Figure 34:
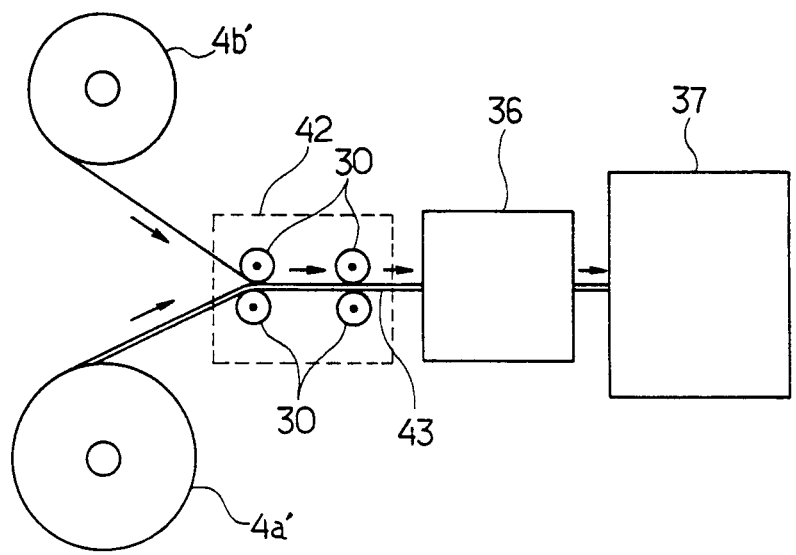
FIG. 34 shows an apparatus for joining the plastic and amorphous sheets to obtain the wedge strip in FIG. 32.
Figure 35:
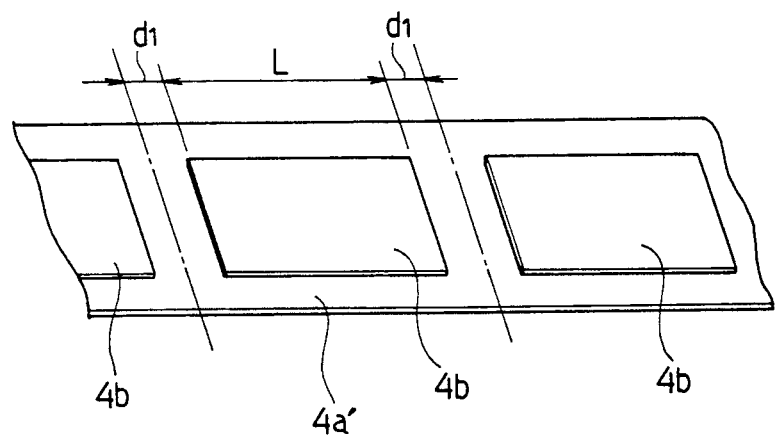
FIG. 35 is a perspective view of a further different wedge strip.

FIGS. 32 to 34 illustrate the non-magnetic sheet 4a and the amorphous sheet 4b caulked so that they are laid one upon the other, without using the bonding agent. A number of engagement holes 40 are formed in the amorphous sheet strip 4b' at predetermined intervals before it is rolled up, as shown in FIG. 33. A number of projections 41 are previously formed on the plastic sheet strip 4a' at the same pitch as in the engagement holes 40. In the process that these sheet strips 4a', 4b' pass through the guide rollers 30 disposed in a heating chamber 42, the projections 41 are inserted through the respective engagement holes 40 and the distal ends of the projections 41 are melted by application of heat such that each distal end engages the periphery of each engagement hole 40, as shown in FIG. 33. Thus, the plastic sheet strip 4a' and the amorphous sheet strip 4b' are laid one upon the other and the wedge sheet strip 43 is obtained. The wedge sheet strip 43 is processed by the shaping apparatus 36 and the cutting apparatus 37 in the manner as described above and the wedges 4 are obtained.

Figure 36:
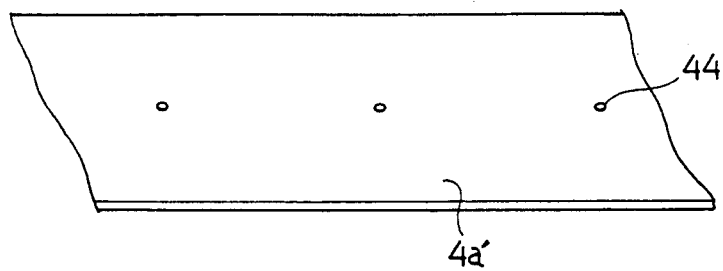
FIGS. 36 and 37 are perspective views of different plastic sheets with position signal generating portions applied to an apparatus for obtaining the wedge strip in FIG. 35.
Figure 37:
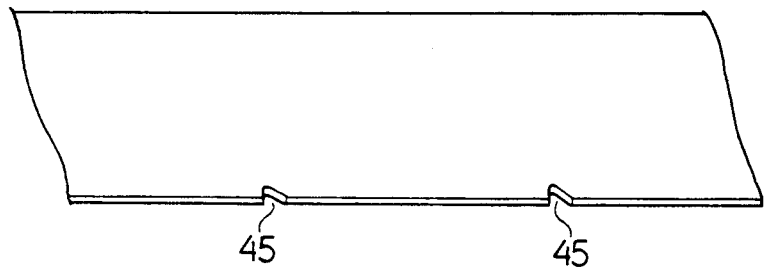

Although the amorphous sheet strip is bonded to the plastic sheet strip in the above-described apparatuses, the amorphous sheets 4b each having the dimension L as shown in FIG. 10 may be disposed in the longitudinal direction at intervals of 2d1, and the plastic sheets 4a may be bonded to the amorphous sheets 4b. This method can be performed by an apparatus operated in the same manner as in a well known automatic labeling machine. In order to obtain a position signal for determining the above-described intervals 2d1 of the amorphous sheet strips 4b' relative to the plastic sheet strips 4a', signal apertures 44 or small projections (not shown) may be formed in the plastic sheet strip 4a' at predetermined intervals, as shown in FIG. 36. Alternatively, Signal notches 45 may be formed in the plastic sheet strip 4a' at predetermined intervals.

Figure 38:
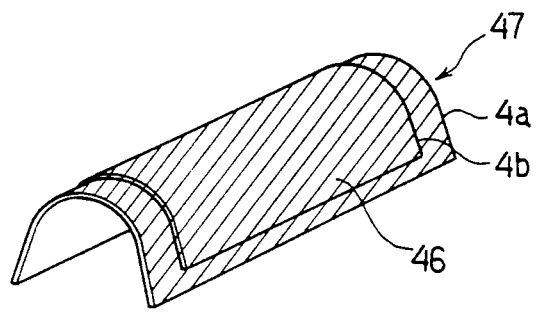
FIGS. 38 and 39 are perspective views of the magnetic wedge of a thirteenth embodiment having different arrangements.
Figure 39:
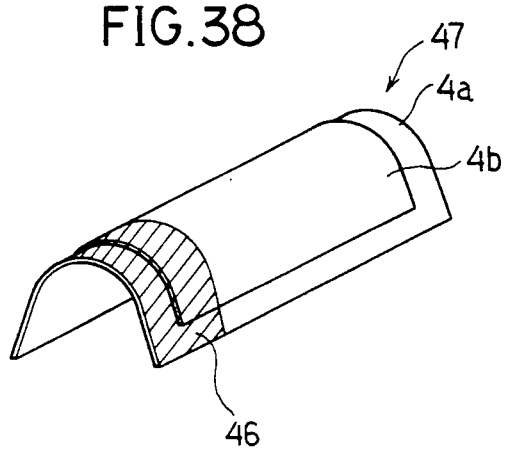

FIGS. 38 and 39 illustrate different methods of bonding the non-magnetic sheet 4a and the amorphous sheet 4b. The magnetic wedge 47 shown in FIG. 38 has a coated layer 46 formed by coating a plastic material liquid on the outer side of the amorphous sheet 4b and the portion of the non-magnetic sheet 4a exposed from the amorphous sheet 4b so that these sheets 4a, 4b are joined together. The coated layer 46 is shown by oblique lines in FIG. 38 for convenience' sake. Since the step formed by the peripheral edge of the amorphous sheet 4b is flattened by the coated layer 46, the amorphous sheet 4b can be effectively prevented from being removed from the wedge when it is inserted into the stator core slot.

Referring to FIG. 39, the coated layer 46 is provided on the end side of the non-magnetic sheet 4a and a portion of the amorphous sheet 4b at the end side of the non-magnetic sheet 4a, from which end side the magnetic wedge being inserted into the stator core slot. The coated layer 46 may be formed on both end sides of the amorphous sheet 4b and adjacent portions of the plastic sheet 4a or both longitudinal end sides of the amorphous sheet 4b and adjacent portions of the plastic sheet 4a.

Figure 40:
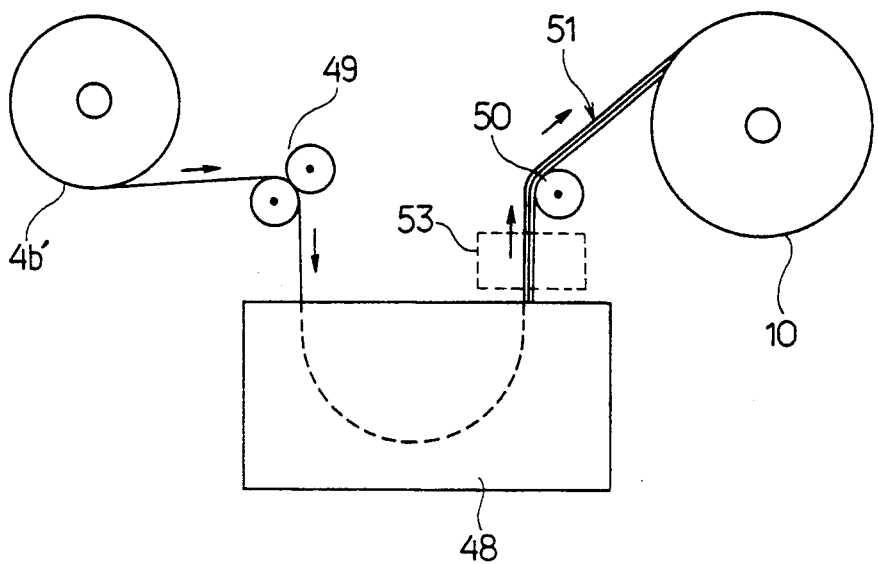
FIG. 40 shows a method of making the magnetic wedge having further another arrangement.
Figure 41:
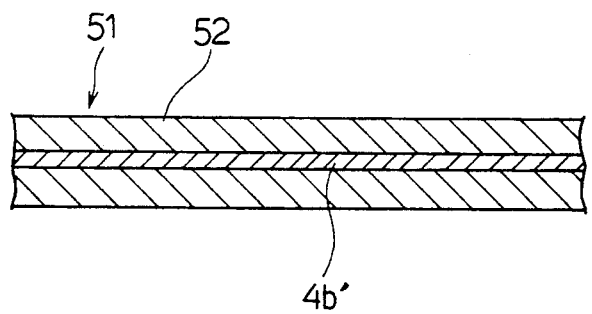
FIG. 41 is a longitudinal section of the wedge strip formed by the apparatus shown in FIG. 40.

FIGS. 40 and 41 illustrate a different method of making the magnetic wedge. The rolled amorphous sheet strip 4b' is unrolled by guide rollers 49 and 50 and is caused to pass through the insulation plastic material liquid such as polyester, epoxy, varnish or the like contained in a vessel 48 and then, through drying means 53. Subsequently, the amorphous sheet strip 4b' is rolled up as the wedge sheet 51. Consequently, the insulation plastic material liquid is adhered to the surface of the amorphous sheet strip 4b' when it passes through the liquid in the vessel 48 and the amorphous sheet surface is dried by the drying means 53. Thus, the insulation coated layer 52 corresponding to the non-magnetic sheet 4a is formed. The wedge sheet 51 thus obtained is formed into the U-shape as shown in FIG. 1 and cut into pieces with suitable dimensions, obtaining the magnetic wedge.

An amorphous film may directly be formed on the surface of the non-magnetic sheet by way of metal plating or sputtering such that the amorphous sheet bonded to the non-magnetic sheet is obtained.

The foregoing disclosure and drawings are merely illustrative of the principles of the present invention and are not to be interpreted in a limiting sense. The only limitation is to be determined from the scope of the appended claims.

We claim:

1. A double laminated sheet type magnetic slot wedge dimensioned for insertion in a slot of a stator core of a dynamo-electric machine so as to close an opening of the slot for preventing a coil embedded in the slot from getting out of the slot, the wedge comprising a thin flexible non-magnetic sheet having a first face and a second face opposite the first face and a flexible amorphous sheet bonded to the first face of the non-magnetic sheet, wherein the second face of the non-magnetic sheet faces the coil when the wedge is inserted in the slot, and wherein the flexible amorphous sheet is an alloy consisting of a first material comprising cobalt, iron, nickel, and niobium, and a second material comprising silicon and boron.

2. A magnetic slot wedge according to claim 1, wherein the amorphous sheet has a dimension approximately as large as a longitudinal length of the slot.

* * * * *